Oct. 18, 1966  G. J. NICCOLI  3,279,787
SHEET-FEEDING METHOD AND APPARATUS
Filed June 22, 1964  6 Sheets-Sheet 1
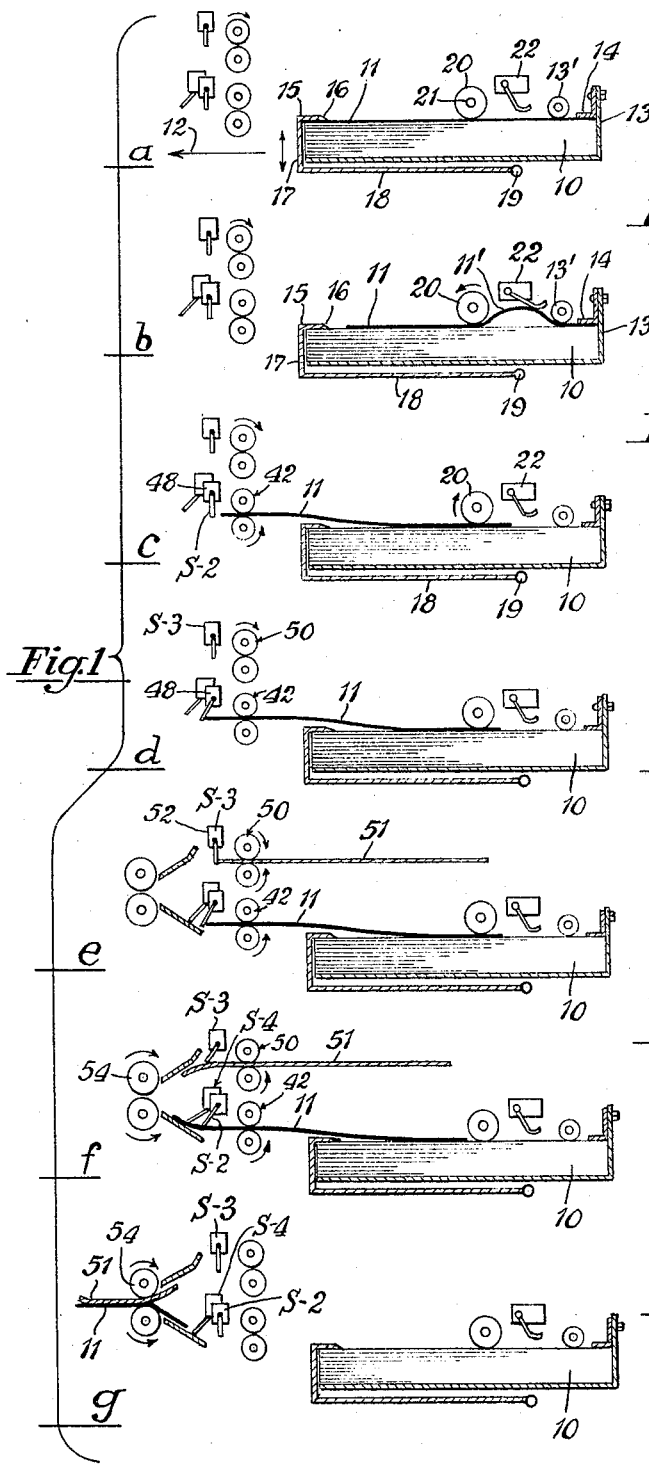
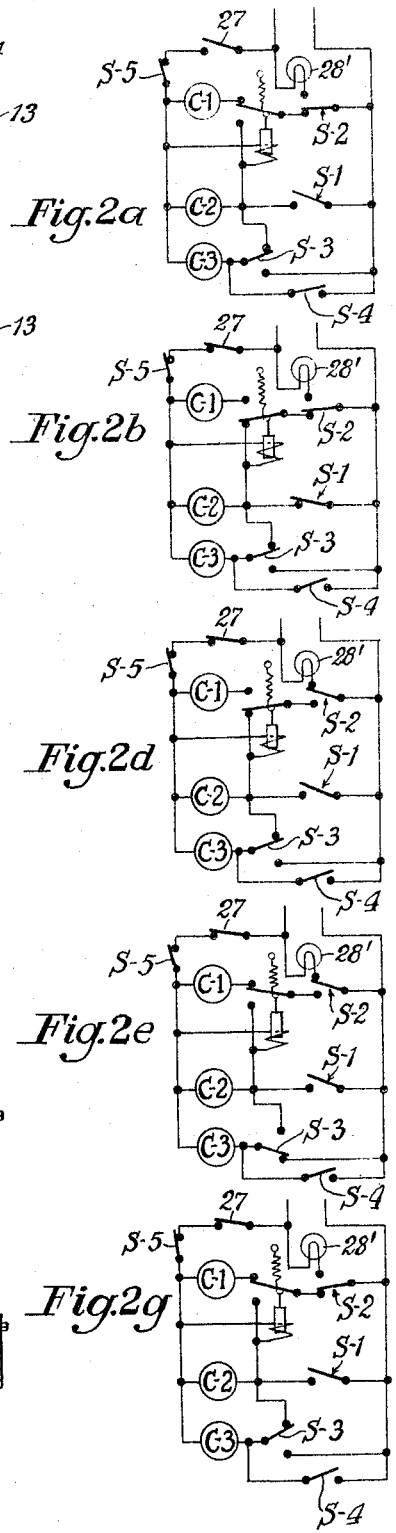

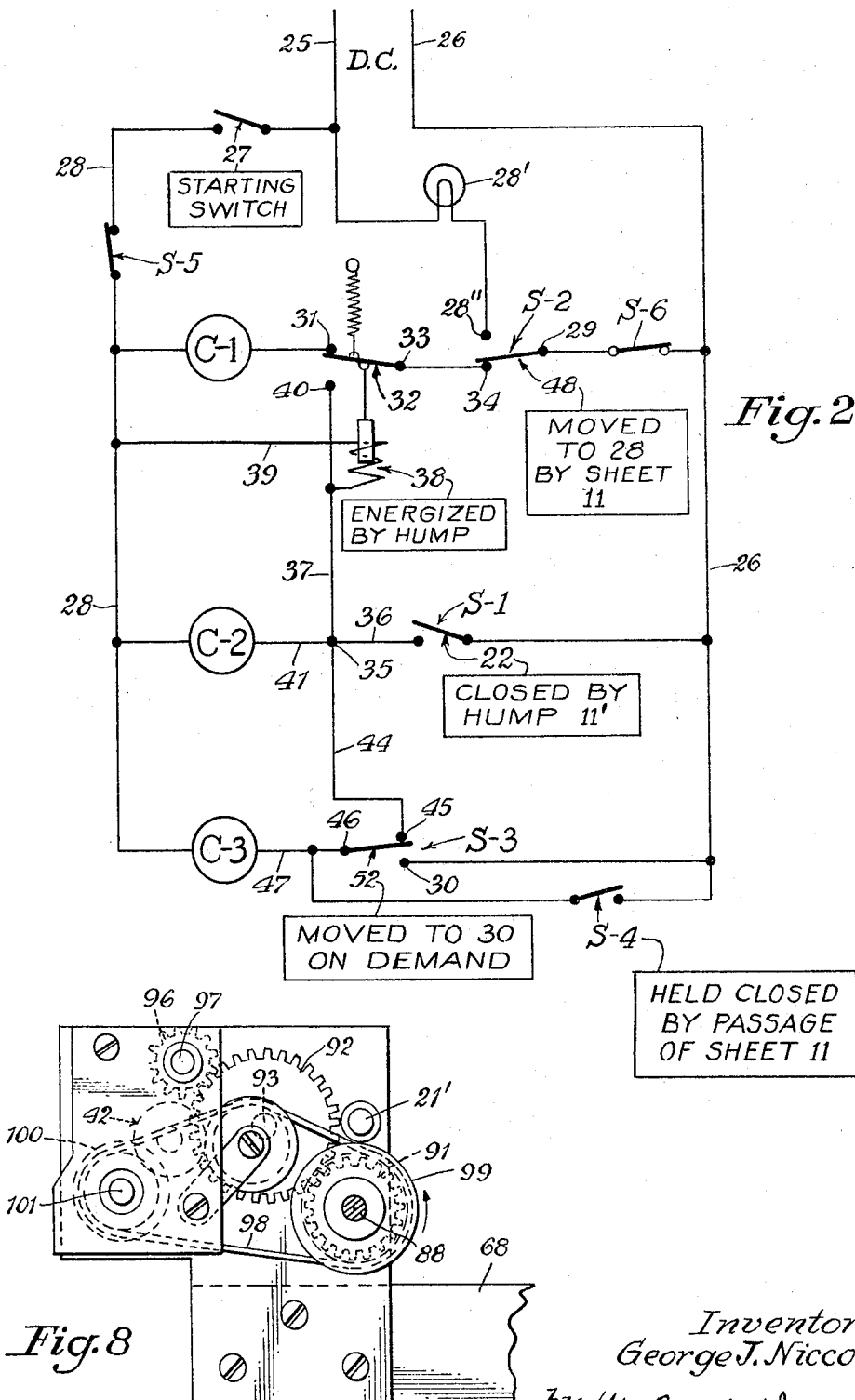

Oct. 18, 1966

G. J. NICCOLI 3,279,787

SHEET-FEEDING METHOD AND APPARATUS

Filed June 22, 1964

Inventor
George J. Niccoli
by W. Bartlett Jones,
Attorney

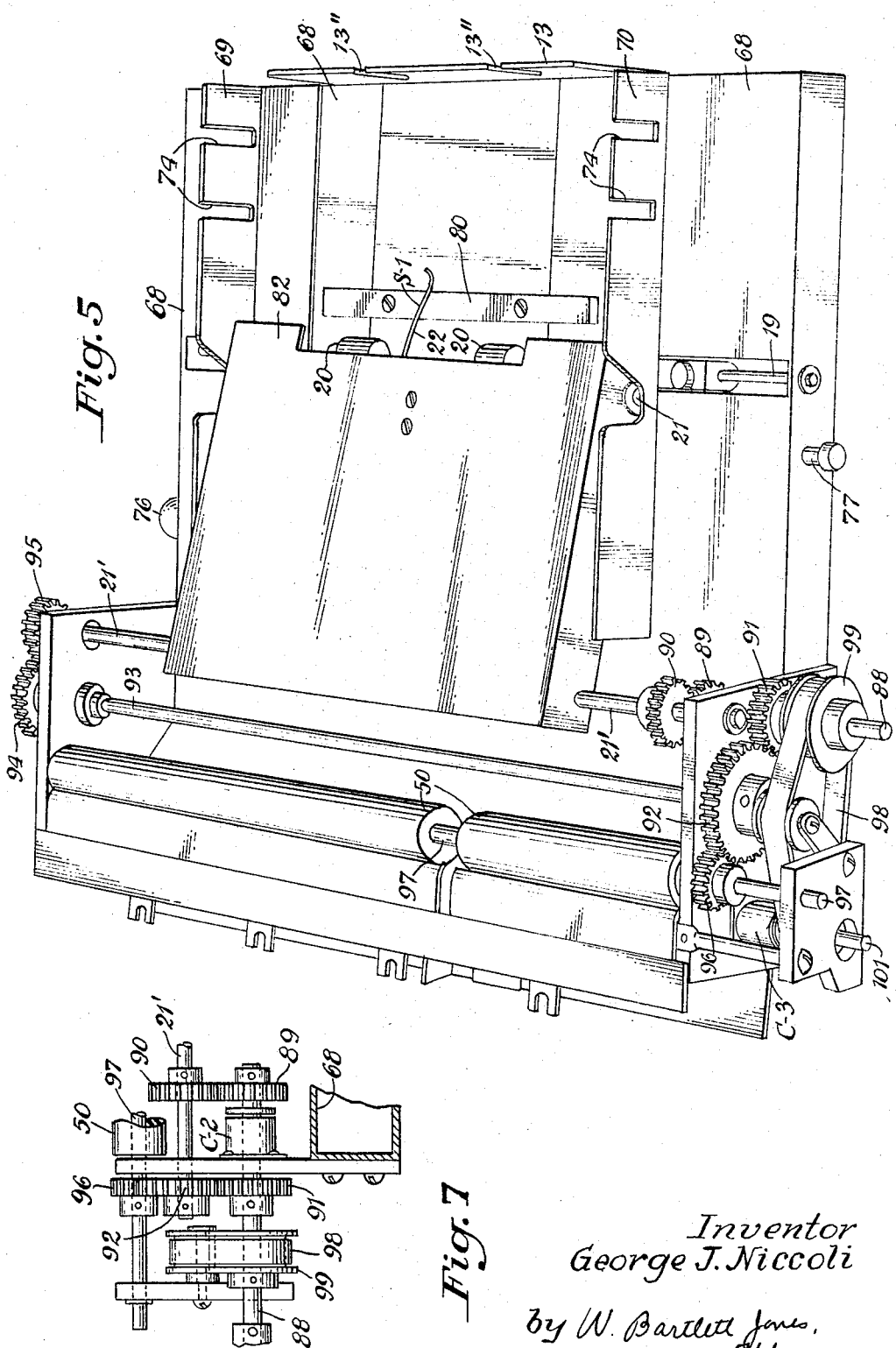

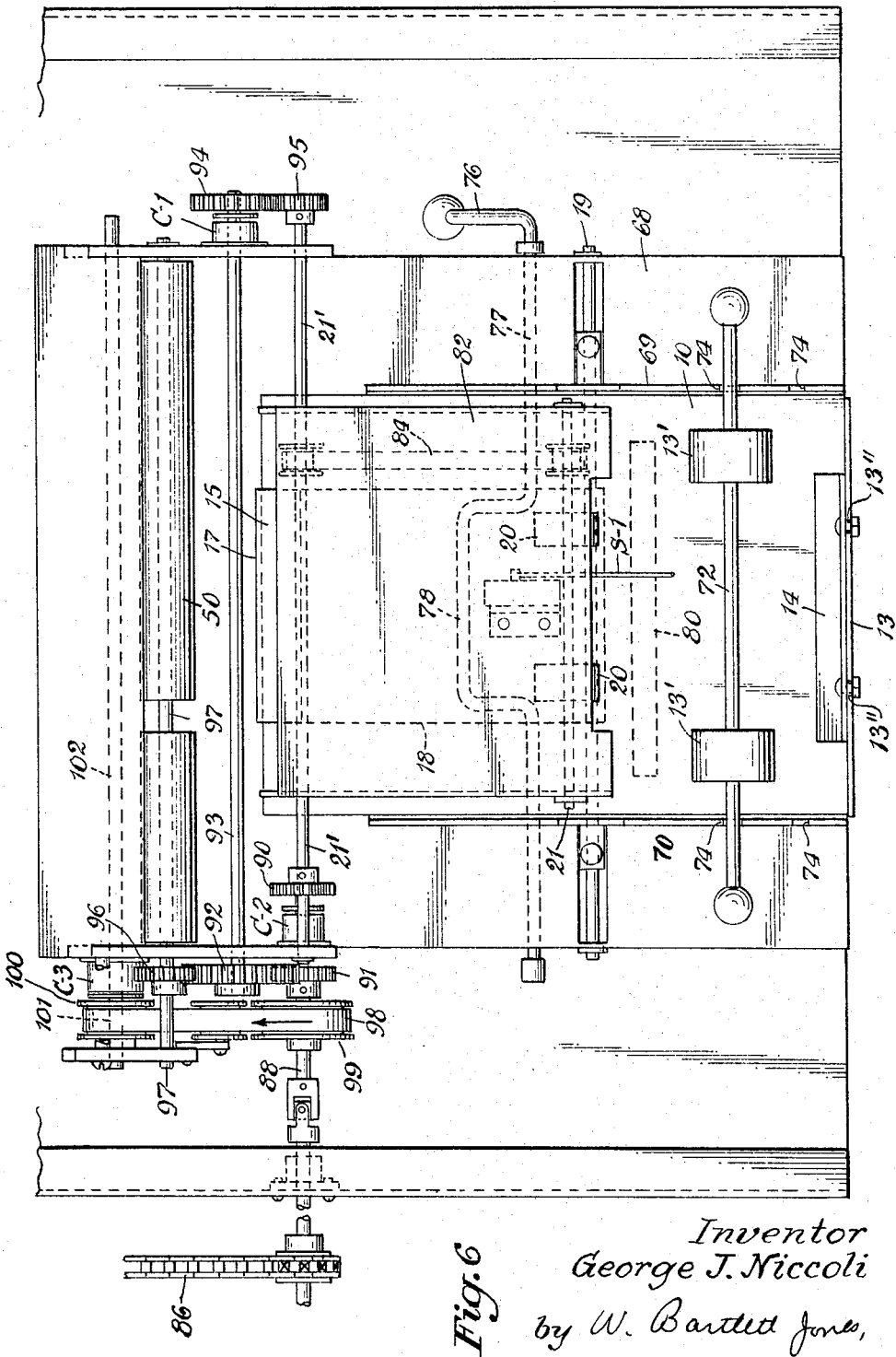

3,279,787
SHEET-FEEDING METHOD AND APPARATUS
George J. Niccoli, Chicago, Ill., assignor to The Frederick
Post Co., Chicago, Ill., a corporation of Illinois
Filed June 22, 1964, Ser. No. 376,788
14 Claims. (Cl. 271—21)

The present invention relates to means for feeding single sheets from a stack thereof in response to a demand for a sheet, and in particular, to means whereby a second sheet not from the stack demands a fed sheet to combine the two for travel in facial contact preferably with substantially coincident edges.

The invention is useful for reproducing copies from originals as in diazotype printing. In this operation an original is combined with a copy sheet for exposure to produce an image on the copy sheet. By means of the present invention, there is provided a stack of the copy sheets from which stack a sheet may be automatically removed and readied for combining with an original fed to the apparatus.

The object of the invention is to provide means for removing a top sheet from a stack into a position of readiness for further movement on demand.

A particular object of the invention is to cause a moving second sheet to demand a readied sheet to combine with it.

Various other and ancillary objects and advantages of the invention are set forth hereinafter in connection with the accompanying drawings, in which:

FIGS. 1a to 1g diagrammatically represent the operations and pertinent structure.

FIG. 2 is an electrical diagram of the circuits involved.

FIGS. 2a, 2b, 2d, 2e, and 2g show the sequence of connections in the circuits of FIG. 2.

FIG. 5 is a perspective view of a portion of the apparatus with no stack of sheets in place.

FIG. 6 is a plan view of the apparatus as seen in FIG. 5 but with a stack in place, showing gear trains.

FIGS. 7 and 8 are different views of the gear trains.

Figure 4:
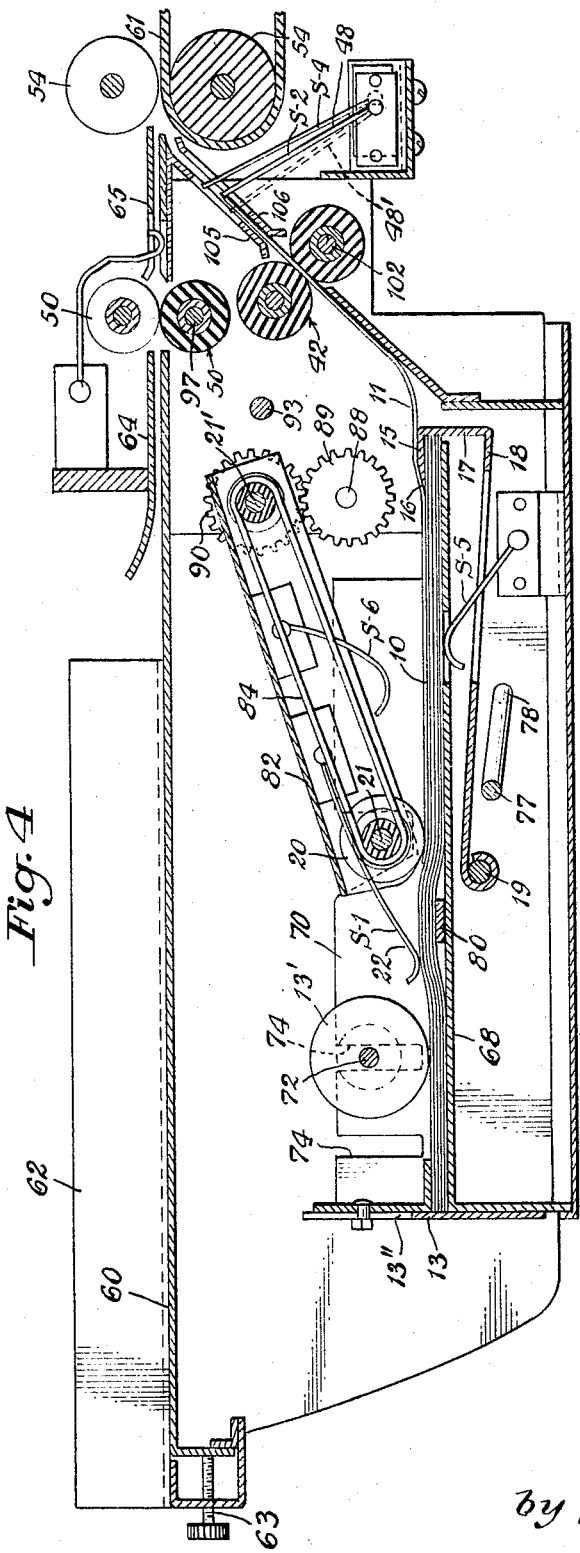
FIG. 4 is a more detailed view in cross-section enlarging on the diagrams of FIG. 1 with the feeding direction reversed.

In general, the sequence of steps is to confine the rear end of the top sheet of the stack, preferably by confining and holding down the rear of the stack, confining and holding down the front edge of the stack by means including a thin blade over at least a portion of a narrow top band at the front edge, then pushing rearwardly the forward portion of the top sheet to remove it from under the blade, and thereby forming a hump. Next the sheet is automatically advanced over the blade and into feed rolls against a limit switch which operates to arrest the forward movement by stopping the feed rolls. Then on demand by suitable means the feed rolls again operate to feed the sheet for further utilization.

To make the feeding automatic the hump is formed by means including a powered friction roll, and the hump operates a switch to reverse the friction roll to move the sheet and start the feed rolls. When the demand causes the sheet again to advance, the friction roll is not powered and merely idles as the sheet is pulled from under it by the feed rolls.

FIG. 1 represents diagrammatically a sequence of operations which can be carried out by the apparatus later described in detail. FIG. 1a represents a stack 10 of rectangular sheets, such as light-sensitive diazotype sheets, of which the top sheet 11 is shown by a heavy line. Sheets are to be fed in a forward direction indicated by arrow 12.

The rear end of the stack is backed by a vertical wall 13 and the top sheet is held down by a floating angular member 14 which drops by gravity as the stack is lowered. The back wall 13 with float 14 is positionable rearwardly to accommodate longer sheets. The forward edge of the stack is held against forward movement by means which is automatically lowered as the stack is lowered, and which is so designed that the top sheet of the stack can be moved forward, as described later herein. A suitable means is an angular form providing a thin-edged piece 15 overlying at least a lengthwise portion of a narrow band at the forward edge of the sheet. The edge 16 of the piece 15 is almost a knife-edge so as not to provide an obstruction, as later mentioned. The piece 15 is weighted down, being a flange on an angular member having front plate 17 and bottom plate 18 on a fixed pivot 19, so that the whole drops as the stack is lowered, and so that the edge 16 rests on the last sheet of the stack.

Forward of the hold-down 14 is a weighted idling roll means 13' also functioning to hold down the rear portion of the top sheet, said roll means being freely rotatable as the sheet is drawn forward from under. It serves as a back stop to locate the hump at the desired region to actuate an electric switch. The forward position of the hold-down roll means 13' is adjustable to function properly with different weights of the stacked paper.

On top of the stack as shown is friction-roll means 20 on a shaft 21 arranged by controlled clutch connections to the shaft to move the top sheet first rearwardly and then forwardly, and to idle when the sheet is otherwise moved. Between the roll means 20 and the rear edge is a normally open trigger-operated switch 22 positioned to be closed as shown in FIG. 1b by forming a hump 11'.

FIG. 2 shows diagrammatically a suitable electric circuit with certain associated mechanical parts to supplement the explanation of FIG. 1. FIG. 2 represents switches designated S–1, S–2, S–3 and S–4, being numbered in their sequence of operation, and by safety switches S–5 and S–6. It also represents three clutches C–1, C–2 and C–3, numbered in accordance with the sequence of operation.

S–2(NC–NO) refers to a single pole double throw switch, NC meaning normally closed and NO meaning normally open. Direct current low voltage power lines are designated 25 and 26. A manually operated starting switch 27 is connected one side to power line 25 and the other side to line 28. A pilot light 28' is connected one side to line 25 and the other side to normally open contact 28" of switch S–2(NC–NO), of which the pole contact 29 is connected to hot line 26. Hot line 26 is connected to switch S–1(NO) which is switch 22 in FIG. 1a, and to the normally open contact 30 of single pole double throw switch S–3(NC–NO). Switch S–4(NO) is in parallel with switch S–3 and is closed by the passage of a sheet 11. Switch S–5(NC) is opened when the last sheet of stack 10 is used. Switch S–6(NC) is opened when by some circumstance a sheet 11 is crumpled above the stack 10 without being fed.

The remaining portions of the circuitry of FIG. 2 are described in conjunction with further description of FIGS. 1a to 1g. Opposite the FIGS. 1a, 1b, 1d, 1e and 1g are FIGS. 2a, 2b, 2d, 2e and 2g, showing the status of various switches of FIG. 2 in the same wiring diagram, minus the indicia. In the sub-FIGS. 2, the safety switch S–6 is omitted since its function is collateral and for an emergency condition. FIGS. 1a and 2a show the idle status with starting switch 27 open. FIGS. 1b and 2b show the starting switch 27 closed and the switch S–1 being closed momentarily by hump 11', to effect the status shown in FIG. 1c, sheet 11 being moved into and by feed rolls 42 toward limit switch S–2. FIGS. 1d and 2d show the sheet 11 operating the limit switch S–2 to halt rotation of feed rolls 42 and to light the signal lamp 28'. FIGS. 1e and 2e show an additional sheet 51 operating demand switch S–3 to create the movement indicated in FIG. 1f. In FIG. 1f, the sheet 11 is longer than sheet 51, which latter on leaving switch S–3 would stop the feed rolls 42 which move sheet 11, except that passage switch S–4 is positioned to be closed by sheet 11 after switch S–2 is operated by approach of sheet 11. Thus, either or both of sheets 11 and 51 in passing switches S–3 and S–4 keep the feed rolls 42 in operation. FIGS. 1g and 2g show the sheets 51 and 11 past their respective switches, thus again engaging clutch C–1 to effect the status of FIGS. 1b and 2b.

The shaft 21 (FIG. 1a) is rotated by engaging magnetic clutch C–1 (FIG. 2) which is energized by closure of manual switch 27 completing the circuit: line 28, clutch C–1, contact 31 of normally closed double throw single pole relay switch 32 and its pole contact 33, contact 34 of normally closed switch S–2(NC–NO) including its pole contact 29, normally closed safety switch S–6, and hot line 26.

Clutch C–1 effects rotation of the friction roll 20 to move sheet 11 (FIG. 1b) rearwardly forming the hump 11'. Forming the hump introduces air between the top sheet and the stack below to assure clean separation of the top and second sheets. Switch S–1(NO) of FIG. 2 is shown as switch 22 in FIGS. 1a and 1b, and as being closed by the hump in FIG. 1b. The effect of the closure is to reverse the rotation of the friction roll 20 and starting the feed rolls 42. This is accomplished through the relay switch 32 by de-energizing clutch C–1 and energizing magnetic clutch C–2, both connected to turn shaft 21.

In FIG. 2 to the right of C–2 there is a junction point 35 with connection 36 to switch 22, and connection 37 to energize a solenoid 38 connected by line 39 to power line 28. Junction 35 is also connected to a second contact 40 of relay switch 32, so that energizing the solenoid 38 by the hump-closing of switch 22 disengages magnetic clutch C–1, and maintains the solenoid energized after the switch 22 is opened by removal of the hump. Junction 35 is also connected by line 41 to magnetic clutch C–2, connected also to line 28. Thus, when switch 22 is closed by hump 11', the clutch C–2 effects reversal of the shaft 21 so that the sheet 11 is fed forward as shown in FIG. 1c.

In FIG. 1b the sheet is pulled out from under the edge 16, which, being like a knife-edge, permits the sheet 11 to ride forwardly over it without being obstructed by the edge 16, as shown in FIG. 1c. Forward movement of the sheet 11 carries it to the set of feed rolls 42 which are rotating to advance the sheet concurrently with friction roll means 20. Rotation of feed rolls 42 is effected by energizing magnetic clutch C–3, as follows:

The power to energize clutch C–3 is effected through path: line 26, switch S–6, contact 29, switch S–2(NC–NO), contact 34, contact 33, energized relay switch 32, contact 40, connection 37, junction 35, line 44 to contact 45 of switch S–3(NC–NO), the latter's pole contact 46, line 47, clutch C–3, and line 28, with the alternative path to hot line 26 around switch S–3 and through switch S–4 when switch S–3 is moved to contact 30 by passage of sheet 51 beyond switch S–3.

FIG. 1c shows a limit switch 48 in the path of the advancing sheet 11, this being switch S–2(NC–NO), to be actuated to break the connection to the relay switch 32 and hence to clutches C–2 and C–3, thus stopping the sheet 11. The actuation of the limit switch S–2 or 48 effects its closure at contact 28'' to light the pilot light 28'. The light merely indicates that there is a sheet from the stack ready to advance on demand. At this point the apparatus is at rest, except for the indication of readiness by the lighted pilot light 28'.

On demand effected by actuation of a demand switch S–3, the sheet 11 is then advanced by feed rolls 42 while the friction roll 20 previously driven with driven feed rolls 42 is conditioned merely to idle as the feed rolls 42 pull sheet 11 from under the friction roll 20.

A demand switch may be variously operated, even manually. However, for the preferred use of the apparatus, it is shown as operated by feeding a single second sheet into continuously operating feed rolls to be combined with the sheet 11. So long as such sheet is passing switch S–3 the feed rolls 42 operate.

FIG. 1d shows the ready-position of the sheet 11 awaiting demand, as evidenced by the light 28'. The absence of rotation arrows shows the stopped positions.

Above the feed rolls 42 there is a region having continuously operating second feed rolls 50 into which is shown as having been fed, a second single sheet 51, such as a tracing. The demand switch S–3 or 52 is positioned to be actuated from first to second position by the sheet 51 advancing and passing the switch at the same predetermined speed as the feed rolls 42 move sheet 11. Upon actuating demand switch S–3 or 52 the hot line 26 at its contact 30 connects through the switch, its contact 46 and line 47 to clutch C–3 again operating first feed rolls 42. Thus, the rolls 42 feed while the friction roll means 20 idles as the sheet 11 moves from under it.

The positions of the limit switch S–2 and demand switch S–3 are preferably such that the sheets 51 and 11 come together with their forward edges substantially coincident. FIG. 1f shows the two sheets being brought together for facial contact for entering a third set of continuously operating feed rolls 54.

So long as demand switch 52 is actuated to open at contact 45 and close at contact 30 by passage of the single sheet, clutch C–3 rotates the feed rolls 42. Because of switch S–4, either sheet 11 or sheet 51 may be the longer. Without switch S–4 a shorter sheet 51 leaving switch S–3 would cause feed rolls 42 to stop. Only when both sheets have passed their switches S–3 and S–4 do the feed rolls 42 stop and thus permit repeating the cycle to bring another sheet in readiness for demand.

Figure 3:
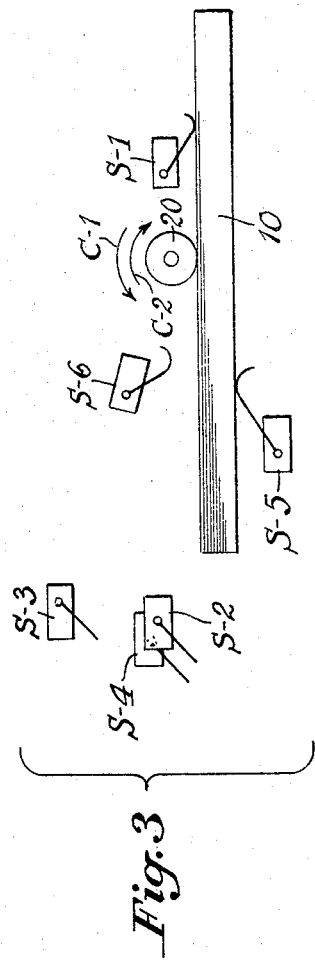
FIG. 3 is a positional diagram for the various switches of FIG. 2.

FIG. 3 shows diagrammatically the general positional relationship of the various switches. Switch S–1 lies to the rear of friction roll 20 both over a paper stack 10. Passage switch S–4 is just forward of limit switch S–2, and above them is shown demand switch S–3. Below the stack is a normally closed switch S–5 opened by removal of the last sheet of the stack, being in series with the starting switch 27 (FIG. 2) to stop the sheet-feeding action. Between the feed rolls 42 and the friction roll 20 is safety switch S–6 (NC) arranged to be opened by accidental crumpling of a sheet ahead of the feed rolls 42. This is located (FIG. 2) between hot line 26 and switch S–2. When opened it has the same effect as operating the limit switch S–2 by a moving sheet, thus stopping further action of the machine. On removing the crumpled sheet and closing switch S–5, clutch C–1 is again effective to form a hump and repeat the cycle.

In FIG. 4 the mechanical structure embodying the principles of FIG. 1 are best illustrated, the parts being numbered as in FIG. 1. A platform 60 is provided on which the demand sheet 51 is fed (to the right) into the continuously operating feed rolls 50 to trip switch S–3 and to feed the sheet 51 into feed rolls 54 which include belt conveyor 61. On platform 60 is a guide plate 62 for sheet 51 adjustable in its lateral position by the screw-clamp structure 63. Sheet 51 is guided to the feed rolls 50 by overlying plate 64 and to feed rolls 54 by overlying plate 65.

Beneath platform 60 the stack of sheets and the feeding means are located. The stack 10 rests on platform 68, which is provided with laterally adjustable side plates 69 and 70 (FIG. 5) to accommodate different widths of stacks, and a rear wall 13, slotted at 13" for allowing the hold-down 14 to drop with the stack. Rear wall 13 is adjustable by means not described to accommodate various lengths of stack. Side walls 69 and 70 are slotted to hold a shaft 72 on which weighted rolls 13' hold the stack down. A series of slots 74 is provided to position the rolls 13' as desired.

The plate 18 hinged at 19 may be raised manually for inserting a stack under the blade 15, by a crank 76 (FIG. 6) on shaft 77 having an inside U-shaped crank portion 78.

On the platform 68 is a cross bar 80 to form a slight rise in the stack 10, causing the stack to have a slight curvature, thus to minimize any tendency of the sheets to cure.

The friction roll 20 is carried in a casing 82 pivoted on a companion shaft 21' which drives shaft 21 by a connecting belt 84. This permits friction roll 20 to drop as the stack is depleted.

In FIG. 6 a chain drive powers the parts by turning main shaft 88. Shaft 88 is effective through gearing to rotate shaft 21' in both directions, first to form the hump 11' and then to reverse and move sheet 11 forwardly. Shaft 88 (FIGS. 5, 6 and 7) has a gear 91 meshing with gear 92 which is fast on one end of shaft 93. On the other end is a gear 94 operable with shaft 93 only when the adjacent magnetic clutch C–1 is actuated for engagement. Gear 94 meshes with gear 95 fast on the shaft 21', thus turning shaft 21' so that the friction rolls form the hump. Also, shaft 88 (FIG. 7) has gear 89 loose on the shaft 88 and adjacent magnetic clutch C–2 which when actuated turns gear 89. Gear 89 meshes with gear 90 fast on shaft 21' which is thus rotated by the actuating clutch C–2 to advance the sheet 11. Gear 92 meshes with gear 96 on shaft 97, which carries the continuous feed rolls 50. The gap shown in feed roll 50 (FIGS. 5 and 6) is the location for switch S–3.

To operate the first feed rolls 42, there is a belt drive 98 from pulley 99 on shaft 88 to a pulley 100 on a shaft 101 aligned with shaft 102 and connected by magnetic clutch C–3.

In FIG. 4, the sheet 11 is shown as having passed through feed rolls 42 and between guiding plates 105–106 and against switch S–2 or 48, which it has moved from its normal dotted line position 48', just short of reaching passage switch S–4. In operating when the sheet 11 passes switch S–4, the plates 105–106 guide it to the continuous feed rolls 54 and conveyor belt 61 where it is timed to coincide with the arrival of a sheet 51 from the platform 60.

Figure 9:
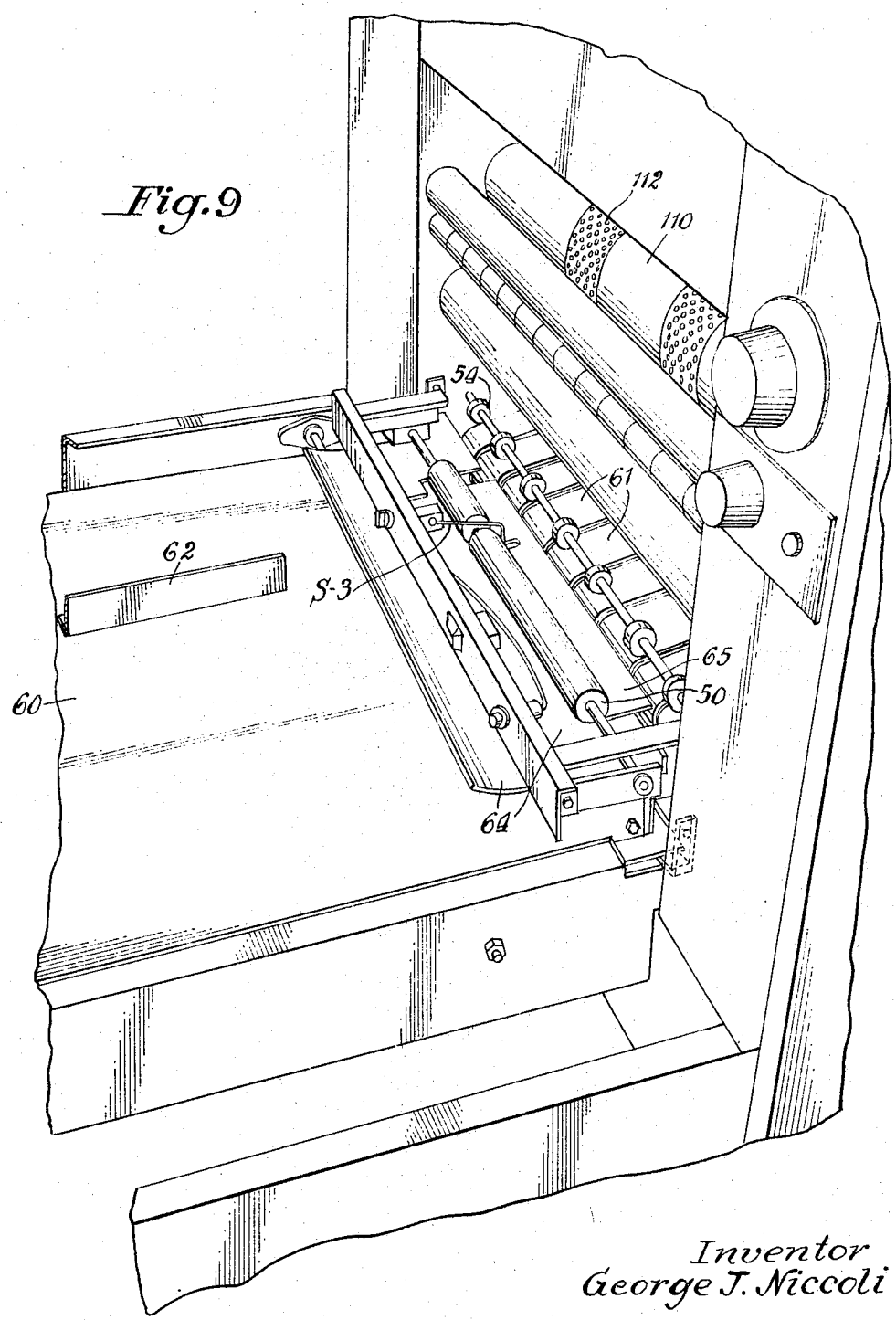
FIG. 9 shows the face of a light-printing apparatus with which the illustrated parts are associated.

In the preferred use of the machine as described the sheet 51 is a tracing or the like through which a sheet 11 is light-printed, as in the diazotype field. FIG. 9 shows apparatus associated with the parts above described for exposing the combined sheets to light. The conveyor belts carry the two sheets to and around a light-printing cylinder (not shown) such as described in Newlin U.S. No. 3,138,374, which delivers the two sheets to a separating cylinder 110 characterized by perforations exerting suction to carry the printed sheet 11 further forward for development and to return the sheet 51 in the rearward direction for again feeding it from the platform 60.

It is to be understood that the mechanical embodiment shown in the drawings is the presently preferred form of the invention and is subject to modification and changes falling within the scope of the invention as expressed in the appended claims.

I claim:

1. The method of feeding a single sheet from a stack thereof for travel at a predetermined speed in a forward direction, comprising placing a stack of rectangular sheets in position for moving the top sheet in said direction, holding the rear end of the top sheet down and against rearward movement relative to the underlying sheets, holding the forward edge of the top sheet down by means including at least one thin-edged portion overlying a portion of a narrow band at the forward edge of the top sheet, closing a normally open starting switch and thereby actuating rotary friction roll means to move the forward portion of the top sheet rearwardly out from under said thin-edged portion and simultaneously forming a hump in the top sheet between said friction roll means and said rear edge, actuating a reversing switch by formation of said hump and simultaneously through said switch reversing said friction roll means whereby to move said top sheet at said predetermined speed in the forward direction over said thin-edged portion and into first feed roll means, said first feed roll means being actuated by the hump-operation of said reversing switch to receive and move the top sheet at the said predetermined speed, said first feed roll means moving said top stack sheet into position for the forward edge to actuate a limit switch, actuation of said limit switch effecting stoppage of the rotation of said friction roll means and of said first feed roll means; actuating a demand switch to initiate forwardly moving rotation of said first feed roll means whereby to move said stack sheet in the forward direction, continuing the rotation of said feed roll means to move said sheet beyond said limit switch by actuating a passage switch in contact with the moving sheet, whereby upon passage of the sheet beyond said passage switch or whereby upon-deactivating said demand switch, whichever is last, said feed roll means stops, and thereafter during continued closure of the starting switch effecting in sequence rearward and forward rotation of said friction roll means and movement of a top sheet from said stack again to actuate said limit switch for arresting action.

2. The method of feeding sheets from separate stations for travel at a predetermined speed in a forward direction in facial contact, comprising placing a stack of rectangular sheets in position for moving the top sheet in said direction, holding the rear portion of the top sheet down against rearward movement relative to the underlying sheets, holding the forward edge of the top sheet down by means including at least one thin-edged portion overlying a portion of a narrow band at the forward edge of the top sheet, closing a normally open starting switch and thereby actuating rotary friction roll means to move the forward portion of the top sheet rearwardly out from under said thin-edged portion and simultaneously forming a hump in the top sheet between said friction roll means and said rear edge, actuating a reversing switch by formation of said hump and simultaneously through said switch reversing said friction roll means whereby to move said top sheet at said predetermined speed in the forward direction over said thin-edged portion and into first feed roll means, said first feed roll means being actuated by the hump-operation of said reversing switch to receive and move the top sheet at the said predetermined speed, said first feed roll means moving said top stack sheet into position for the forward edge to actuate a limit switch, actuation of said limit switch effecting stoppage of the rotations of said friction roll means and of said first feed roll means; feeding a single second sheet at said predetermined speed in the forward direction at a level slightly above the arrested top stack sheet and against and past the demand switch and thereby during passage of the sheet actuating said demand switch to initiate forwardly moving rotation of said first feed roll means whereby to move said stack sheet at said predetermined speed at a location to move in facial contact with said single second sheet, continuing the rotation of said feed roll means to move said stack sheet beyond said limit switch by actuating a passage switch in contact with the moving stack sheet, whereby upon passage of said stack sheet beyond the passage switch or whereby upon de-activation of the demand switch by passage of the single sheet beyond the demand switch, whichever is last, said feed roll means stops, and thereafter during continued closure of the starting switch effecting in sequence rearward and forward rotation of said friction roll means to move a top sheet from said stack, again to actuate said limit switch for arresting action.

3. The method of feeding a sheet from a stack thereof into position for advancement in a forward direction on demand, which comprises holding the rear portion of the stack against rearward movement, closing a normally open starting switch and thereby actuating friction roll means to move the forward end of said top sheet rearwardly and simultaneously forming a hump in the top sheet between the friction roll means and said rear edge, actuating a first switch by formation of the hump, said actuation reversing rotation of said friction roll means whereby the top sheet is moved forwardly and into first feed roll means, said feed roll means being rotated by the hump-actuation of said first switch to move the sheet in the same direction and at the same speed as said friction roll means, actuating a limit switch by the presence of said sheet at the location of the limit switch and thereby stopping rotations of said friction roll means and said first feed roll means, whereby said top sheet is positioned for further advancement on demand, actuating a demand switch and thereby effecting rotation of said first feed roll means, whereby to move said sheet at said predetermined speed, and de-activating said demand switch and thereby effecting stoppage of the rotation of said first feed roll means and during continued closure of the starting switch and with said limit switch in normal position effecting in sequence reverse and forward rotation of said friction roll means and movement of a top sheet from said stack again to actuate said limit switch.

4. The method of moving a top sheet of a stack forwardly over over-ridable means holding down at least a portion of the forward edge of said sheet, which method comprises holding down a rear portion of the sheet against rearward movement, sliding the forward portion of the sheet rearwardly sufficiently to free it from said means and forming a hump in the sheet, actuating an electric switch by formation of said hump and by actuation of said switch effecting forward sliding movement of the sheet and over-riding said means.

5. The method of moving a top sheet of a stack forwardly over over-ridable means holding down at least a portion of the forward edge of said sheet, which method comprises holding down a rear portion of the sheet against rearward movement, sliding the forward portion of the sheet rearwardly sufficiently to free it from said means and forming a hump in the sheet, actuating an electric switch by formation of said hump and by actuation of said switch effecting forward sliding movement of the sheet and over-riding said means, and by actuation of said switch actuating feed roll means in the path of said sheet to carry the forward edge of said sheet at least a predetermined distance from the stack.

6. The method of moving a top sheet of a stack forwardly over over-ridable means holding down at least a portion of the forward edge of said sheet, which method comprises holding down a rear portion of the sheet against rearward movement, sliding the forward portion of the sheet rearwardly sufficiently to free it from said means and forming a hump in the sheet, actuating an electric switch by formation of said hump and by actuation of said switch effecting forward sliding movement of the sheet and over-riding said means, and by actuation of said switch actuating feed roll means in the path of said sheet to carry the forward edge of said sheet at least a predetermined distance from the stack, and arresting said sheet before the rear edge leaves the stack.

7. In apparatus for feeding a top sheet of paper or the like from a stack of sheets, first means including a reversible friction roll normally active to form a hump in a top sheet of which the rear portion is held down and against rearward motion on the stack below, said hump being formed by said roll moving the forward portion of the sheet rearwardly substantially in the plane of the sheet, feed roll means to receive and move said sheet, trigger-operated means arranged to reverse action of said roll and thereby effect movement of the sheet forwardly from its initial position and into said feed roll means and arranged to initiate forward movement of said feed roll means, said trigger-operated means being positioned to be triggered by the presence of said hump, a limit switch positioned just forwardly of said feed roll means and in the path of the sheet moving forwardly by said feed roll means, said limit switch being positioned to be actuated by the approach of said sheet and when actuated being operative to arrest said feed roll means and thereby arrest the sheet at said limit switch, a demand switch having two functioning positions and arranged upon demand actuation from its first normal position to its second position to effect forwarding operation of said feed roll means independently of the control by said limit switch and said trigger-operated means, said demand switch in said first normal position permitting operation of said first feed roll means by actuation of said trigger-operated means, second feed roll means arranged for continuous operation in position to receive said sheet moved forwardly by said first feed roll means, a normally open passage switch positioned forwardly of said limit switch and close to said first feed roll means, said passage switch being closed by passage of the sheet moving from said first feed roll means and when closed arranged to maintain operation of said first feed roll means independently of said demand switch, whereby said first feed roll means stops when said sheet has been moved away from said passage switch by said second feed roll means and when said demand switch is in its said first position, and whereby said passage switch is returned to its normal open position, said passage switch and said demand switch in their said normal first positions being arranged to reactivate said first means, whereby to effect movement from the stack of a second sheet to stopped position at said limit switch.

8. In apparatus according to claim 7 a stop switch positioned for actuation by removal of the bottom sheet of the stack and when actuated arranged to de-activate said first means.

9. Apparatus according to claim 7 having in addition means for actuating said demand switch, said means comprising third feed roll means arranged for continuous operation for receiving a demand sheet fed thereto and arranged to feed said demand sheet to said second feed rolls and for combining it with a sheet from said stack, said demand switch being positioned to be actuated by the moving demand sheet leaving said third feed roll means and to be maintained actuated by passage of the demand sheet, whereby the last trailing sheet is effective to stop operation of said first feed roll means and reactivate said first means.

10. Apparatus for feeding rectangular sheets in a forward direction from a stack, comprising means for holding the stack stationary including essentially means for holding the rear portion of the top sheet down and against rearward movement, rotary friction roll means positionable to contact the top sheet intermediate the forward and rearward edges thereof for moving the underlying portion of the sheet rearwardly and forwardly, magnetic clutch means for engagement to rotate said friction roll means to move said portion of the sheet rearwardly and thereby to form a hump in the sheet rearwardly of said friction roll means, a first electric circuit for energizing and engaging said rearward clutch means to effect rearward rotation of said friction roll means and thereby to form said hump, said circuit including (1) a starting switch initially to energize said circuit, (2) said magnetic clutch means, (3) a two-position relay-operated switch of which a normally closed first position closes said circuit, and (4) a normally closed limit switch; a second magnetic clutch means for engagement to rotate said friction roll means to move said portion of the sheet forwardly, a second circuit when energized arranged to effect engagement of said second clutch means, said circuit including (1) said second clutch means, and (2) a normally open reversing switch positioned to be closed by formation of the hump, and in parallel with said second clutch means a relay-solenoid energized by closure of said reversing switch, said two-position switch being moved to a second closed position by energizing said solenoid, closure at said second position providing a second energizing connection to said second clutch means thereby permitting said second clutch means to remain engaged when said reversing switch is opened when the hump disappears; normally idle feed rolls positioned to receive said forwardly moving sheet and operable to continue forward movement thereof, third magnetic clutch means for engagement to operate said feed rolls, said normally closed limit switch being positioned to be opened by the sheet being moved forwardly by said feed rolls whereby to open the circuits engaging said second clutch means and said third clutch means, thereby to arrest the sheet at said limit switch, demand switch means having a first normally closed position and a second normally open position, said third magnetic clutch means being in series with said demand switch means in the latter's said normally closed position, and said series being in parallel with said second clutch means, said third clutch means, also being energized for engagement through the second position of said demand switch means, whereby on movement of said demand switch means to its second closing position said feed rolls continue rotation and said second clutch means is disengaged, thereby to permit idling rotation of said friction roll means, and a passage switch close to and forwardly of said limit switch arranged to be actuated by passage of said sheet and when actuated being effective to engage said third clutch means, said demand switch means upon movement back to its first closing position opening one circuit to said third clutch means, and said passage switch upon passage of the sheet beyond it opening another circuit to said third clutch means.

11. Apparatus for feeding a top sheet from a stack of sheets into a position of readiness to move forward on demand, friction roll means operable in one direction to move a forward portion of said top sheet in a backward direction against a stationary rear portion and thereby forming a hump in the sheet, first powered means to rotate said friction roll means to form said hump, normally inactive second powered means to reverse the rotation of said friction roll means to move said top sheet forwardly from the stack, normally inactive third powered means for forwardly moving the sheet away from said friction roll means, an electric switch operated by the forming hump to deactivate said first powered means and to activate said second and third powered means, a stop switch in the path of said forwardly moving sheet operated by contact of the sheet therewith, said stop switch on operating deactivating said second and third powered means to arrest movement of said top sheet before the sheet leaves said friction roll means, a normally inactive demand switch arranged for operation to cause said sheet to advance beyond said stop switch, a passage switch operated only by said sheet moving past it, said demand and passage switches when so operated activating said third powered means, whereby when said sheet leaves said passage switch and said demand switch is normally inactive said passage switch deactivates said third powered means.

12. The method of moving a top sheet of a stack forwardly from the stack, which method comprises holding down a rear portion of the sheet against rearward movement, sliding the forward portion of the sheet rearwardly by rotating friction roll means sufficiently to form a hump in the sheet, actuating an electric switch by formation of said hump and by actuation of said switch effecting forward sliding movement of the sheet by reversal of the rotation of said friction roll means, also by actuation of said switch energizing controlled feed roll means in the path of the sheet and continuing forward movement of said sheet by said feed roll means, and thereafter disengaging power from said friction roll means while the latter is in contact with said sheet, whereby said friction roll means is rotated by the sheet moving under it.

13. The method of moving a top sheet of a stack forwardly from the stack, which method comprises holding down a rear portion of the sheet against rearward movement, sliding the forward portion of the sheet rearwardly by rotating friction roll means sufficiently to form a hump in the sheet, actuating an electric switch by formation of said hump and by actuation of said switch effecting forward sliding movement of the sheet by reversal of the rotation of said friction roll means, also by actuation of said switch energizing controlled feed roll means in the path of said sheet to carry the forward edge of said sheet at least a predetermined distance from the stack, thereafter disengaging power from said controlled feed roll means and from said friction roll means while the latter is in contact with said sheet, whereby movement of the sheet is arrested, and on demand energizing said controlled feed roll means for continued forward movement of the sheet away from said stack whereby the moving sheet powers the friction roll as it leaves the stack.

14. The method of moving a top sheet of a stack forwardly from the stack, which method comprises holding down a rear portion of the sheet against rearward movement, sliding the forward portion of the sheet rearwardly by rotating friction roll means sufficiently to form a hump in the sheet, actuating an electric switch by formation of said hump and by actuation of said switch effecting forward sliding movement of the sheet, also by actuation of said switch energizing controlled feed roll means in the path of said sheet to carry the forward edge of said sheet at least a predetermined distance from the stack, thereafter disengaging power from said controlled feed roll means and from said friction roll means while the latter is in contact with said sheet, whereby movement of the sheet is arrested, on demand energizing said controlled feed roll means for continued forward movement of the sheet away from said stack whereby the moving sheet powers the friction roll as it leaves the stack, said feed roll means energized on demand feeding said sheet to continuous feed rolls whereby to move said sheet away from said controlled feed roll means, and thereafter by said sheet actuating switch means effective to de-energize said controlled feed roll means and effective to energize said friction roll means for forming a hump in the remaining top sheet of the stack for repeating the cycle.

References Cited by the Examiner

UNITED STATES PATENTS

| | | | |
|---|---|---|---|
| 1,504,914 | 8/1924 | Stonemetz | 271—21 |
| 2,733,063 | 1/1956 | Corey | 271—57 |
| 2,829,475 | 4/1958 | Schmidt | 271—21 |
| 3,126,536 | 3/1964 | Schnell | 271—57 |

ROBERT B. REEVES, *Primary Examiner.*

STANLEY H. TOLLBERG, *Examiner.*